(12) United States Patent
Randolph et al.

(10) Patent No.: US 12,305,467 B2
(45) Date of Patent: May 20, 2025

(54) SPOOL-TYPE PITLESS ADAPTER FOR GROUNDWATER HEAT EXCHANGER

(71) Applicant: Darcy Solutions, Inc., Excelsior, MN (US)

(72) Inventors: Jimmy Bryan Randolph, Minneapolis, MN (US); David Philip Henrich, Loretto, MN (US); Ryan Matthew Martin-Wagar, Missoula, MT (US)

(73) Assignee: Darcy Solutions, Inc., Excelsior, MN (US)

( * ) Notice: Subject to any disclaimer, the term of this patent is extended or adjusted under 35 U.S.C. 154(b) by 306 days.

(21) Appl. No.: 18/246,219

(22) PCT Filed: Sep. 28, 2021

(86) PCT No.: PCT/US2021/052397
§ 371 (c)(1),
(2) Date: Mar. 22, 2023

(87) PCT Pub. No.: WO2022/072343
PCT Pub. Date: Apr. 7, 2022

(65) Prior Publication Data
US 2023/0399915 A1    Dec. 14, 2023

Related U.S. Application Data

(60) Provisional application No. 63/084,646, filed on Sep. 29, 2020.

(51) Int. Cl.
*E21B 33/047* (2006.01)
*E21B 33/04* (2006.01)
(Continued)

(52) U.S. Cl.
CPC ............ *E21B 33/047* (2013.01); *E21B 33/04* (2013.01); *F24T 10/30* (2018.05); *F24T 2010/50* (2018.05); *Y02E 10/10* (2013.01)

(58) Field of Classification Search
CPC ........ E21B 33/047; E21B 33/04; F24T 10/30; F24T 2010/50; Y02E 10/10
(Continued)

(56) References Cited

U.S. PATENT DOCUMENTS

| 659,375 | A | * | 10/1900 | Myers ................. F28D 20/0052 165/45 |
| 882,034 | A | | 3/1908 | Ward |

(Continued)

FOREIGN PATENT DOCUMENTS

| BE | 880 504 A | 4/1980 |
| CN | 2646631 Y | 10/2004 |

(Continued)

OTHER PUBLICATIONS

Notification of Transmittal of the International Search Report and Written Opinion dated Jun. 15, 2023 of PCT/US2023/015508, filed Mar. 17, 2023.

(Continued)

*Primary Examiner* — Ljiljana V. Ciric
(74) *Attorney, Agent, or Firm* — Brian D. Kaul; Westman, Champlin & Koehler, P.A.

(57) ABSTRACT

A pitless adapter includes a casing having first, second and third ports, and a spool having a top plate, a bottom plate having first, second and third ports, a first middle plate between the top and bottom plates and a second middle plate between the first middle plate and the bottom plate. The casing, the top plate and the first middle plate define a first chamber that is open to the first port of the casing and the first port of the spool. The casing, the first middle plate and the second middle plate define a second chamber that is open to the second port of the casing and the second port of the spool. The casing, the second middle plate and the bottom (Continued)

plate define a third chamber that is open to the third port of the casing and the third port of the spool.

20 Claims, 12 Drawing Sheets

(51) Int. Cl.
    *F24T 10/00*         (2018.01)
    *F24T 10/30*         (2018.01)

(58) Field of Classification Search
    USPC .......................................................... 165/45
    See application file for complete search history.

(56) References Cited

U.S. PATENT DOCUMENTS

| | | | |
|---|---|---|---|
| 2,529,062 A | | 11/1950 | Williams |
| 3,154,148 A | * | 10/1964 | Peterson ................. E21B 33/00 166/85.2 |
| 3,777,502 A | | 12/1973 | Michie, III et al. |
| 4,286,434 A | * | 9/1981 | Moisdon ................. F03G 6/067 165/95 |
| 4,290,266 A | * | 9/1981 | Twite ....................... F03G 4/074 165/45 |
| 4,344,414 A | * | 8/1982 | Balch ................... F28D 20/0052 165/45 |
| 4,448,237 A | | 5/1984 | Riley |
| 4,452,303 A | | 6/1984 | Bontje et al. |
| 4,505,325 A | * | 3/1985 | Bergeron, Jr. ......... F24D 11/009 165/53 |
| 4,531,664 A | | 7/1985 | Baski |
| 4,566,532 A | * | 1/1986 | Basmajian ............... F24T 10/30 165/45 |
| 4,624,300 A | * | 11/1986 | Stubbolo ................... F24D 5/00 165/45 |
| 4,940,087 A | | 7/1990 | Lien et al. |
| 5,224,357 A | * | 7/1993 | Galiyano ................... F25B 1/04 165/45 |
| 5,379,832 A | | 1/1995 | Dempsey |
| 5,590,715 A | | 1/1997 | Amerman |
| 5,758,514 A | * | 6/1998 | Genung .................. F25B 13/00 62/509 |
| 6,138,744 A | | 10/2000 | Coffee |
| 7,578,140 B1 | * | 8/2009 | Wiggs ..................... F25B 30/06 165/45 |
| 7,640,974 B1 | | 1/2010 | Hoeptner |
| 8,161,759 B2 | * | 4/2012 | Kidwell .............. F28D 15/0233 62/260 |
| 8,820,394 B2 | | 9/2014 | Azzam |
| 9,360,236 B2 | | 6/2016 | Stewart et al. |
| 9,556,856 B2 | | 1/2017 | Stewart et al. |
| 9,909,782 B2 | * | 3/2018 | Lakic ................... H02K 7/1823 |
| 10,214,985 B2 | * | 2/2019 | Waldner ................. E21B 33/10 |
| 10,401,057 B2 | | 9/2019 | Woods |
| 11,029,062 B2 | * | 6/2021 | Holtzman ............... E21B 43/26 |
| 11,428,441 B2 | * | 8/2022 | Holtzman ............... F24T 10/17 |
| 2008/0128108 A1 | * | 6/2008 | Clark ..................... F24T 10/10 165/45 |
| 2008/0148758 A1 | * | 6/2008 | Kidwell ................. F28D 7/026 165/45 |
| 2008/0196859 A1 | * | 8/2008 | Kidwell ................. F24T 10/17 165/45 |
| 2010/0139886 A1 | * | 6/2010 | Desmeules ............... F03G 7/04 175/57 |
| 2010/0288465 A1 | | 11/2010 | Stewart |
| 2012/0103557 A1 | | 5/2012 | Fernandez et al. |
| 2013/0300127 A1 | | 11/2013 | DiNicolantonio |
| 2014/0133519 A1 | | 5/2014 | Freitag |
| 2016/0069617 A1 | * | 3/2016 | Gil ........................ F28D 7/1669 165/45 |
| 2016/0084591 A1 | | 3/2016 | Crook et al. |
| 2018/0172318 A1 | | 6/2018 | Woods |
| 2018/0223618 A1 | * | 8/2018 | Waldner ................. E21B 43/121 |
| 2022/0018555 A1 | | 1/2022 | Cho et al. |
| 2022/0018577 A1 | | 1/2022 | Randolph et al. |
| 2023/0399915 A1 | * | 12/2023 | Randolph ............... E21B 33/04 |

FOREIGN PATENT DOCUMENTS

| | | |
|---|---|---|
| CN | 2906418 Y | 5/2007 |
| CN | 101074792 A | 11/2007 |
| CN | 103090594 A | 5/2013 |
| CN | 103388934 A | 11/2013 |
| CN | 206648350 U | 11/2017 |
| CN | 106 767 008 B | 10/2018 |
| DE | 29 31 485 A1 | 2/1981 |
| DE | 31 49 636 A1 | 7/1983 |
| DE | 202006019801 U1 | 5/2007 |
| DE | 10 2014 104992 A1 | 10/2015 |
| EP | 0045993 A1 | 2/1982 |
| EP | 0499466 A2 | 8/1992 |
| EP | 1084373 B1 | 11/2002 |
| EP | 1865146 A1 | 12/2007 |
| JP | 2005049016 A | 2/2005 |
| JP | 2009092350 A | 4/2009 |
| JP | 2014025688 A | 2/2014 |
| JP | 2014115016 A | 6/2014 |
| JP | 2015025612 A | 2/2015 |
| JP | 2015218935 A | 12/2015 |
| JP | 2016070597 A | 5/2016 |
| JP | 2017067419 A | 4/2017 |
| KR | 100759403 B1 | 9/2007 |
| KR | 20090128722 A | 12/2009 |
| KR | 101169673 B1 | 8/2012 |
| KR | 20140052456 A | 5/2014 |
| KR | 1020140062639 A | 5/2014 |
| KR | 101498932 B1 | 3/2015 |
| KR | 20160133392 | 11/2016 |
| KR | 101 733 027 B1 | 5/2017 |
| KR | 101792145 B1 | 11/2017 |
| KR | 20180043735 A | 4/2018 |
| KR | 101984988 B1 | 5/2019 |
| SE | 502 610 C2 | 11/1995 |
| WO | 2010022354 A1 | 2/2010 |
| WO | 2011023311 A2 | 3/2011 |
| WO | 2012008992 A1 | 1/2012 |
| WO | 2012066403 A1 | 5/2012 |
| WO | 2012166650 A1 | 12/2012 |
| WO | 2020117946 A1 | 6/2020 |
| WO | 2022047163 A1 | 3/2022 |
| WO | 2022072343 A1 | 4/2022 |

OTHER PUBLICATIONS

Extended European Search Report from European Patent Application No. 21876293.8, dated Aug. 16, 2024.
Communication pursuant to Rule 164(1) EPC from European Patent Application No. 21862828.7, dated Jul. 26, 2024.
Communication pursuant to Article 94(3) EPC for European Patent Application No. 19828095.0 dated Aug. 10, 2023.
Notification of Transmittal of the International Search Report and Written Opinion dated Dec. 20, 2021 of PCT/US2021/047962, filed Aug. 27, 2021.
Notification of Transmittal of the International Search Report and Written Opinion dated Jan. 11, 2022 of PCT/US2021/052397, filed Sep. 28, 2021.
Notification of Transmittal of the International Search Report and Written Opinion dated Mar. 13, 2020 of PCT/US2019/064490, filed Dec. 4, 2019.
Communication pursuant to Rules 161(1) and 162 EPC from European Patent Application No. 19828095.0 dated Jul. 14, 2021.
Naylor et al., "Geothermal Ground Source Heat Pumps and Geology in Indiana" Indiana Geological and Water Survey; Indiana University, publication date: Unknown. Retrieved from https://igws.indiana.edu/Geothermal/HeatPumps on May 28, 2021.
Michiya Suzuki et al. "Development of a spiral type heat exchanger for ground source heat pump system" Energy Procedia 96 (2016) 503-510; available online at www.sciencedirect.com.

(56) References Cited

OTHER PUBLICATIONS

Diao et al. "Heat transfer in ground heat exchangers with groundwater advection" International Journal of Thermal Sciences; vol. 43, Issue 12, Dec. 2004, pp. 1203-1211.

Casasso et al. "Efficiency of closed loop geothermal heat pumps: A sensitivity analysis" Renewable Energy vol. 62, Feb. 2014, pp. 737-746.

Stefano Lo Russo, Cesare Boffa, Massimo V. Civita, "Low-enthalpy geothermal energy: An opportunity to meet increasing energy needs and reduce CO2 and atmospheric pollutant emissions in Piemonte, Italy, Geothermics", vol. 38, Issue 2,2009, pp. 254-262, ISSN 0375-6505,https://doi.org/10.1016/j.geothermics.2008.07.005.(https://www.sciencedirect.com/science/article/pii/S037565050800045X).

Jozsef Hecht-Méndez et al. "Optimization of energy extraction for vertical closed-loop geothermal systems considering groundwater flow", Energy Conversion and Management, vol. 66, 2013, pp. 1-10, ISSN 0196-8904, https://doi.org/10.1016/j.enconman.2012.09.019. (https://www.sciencedirect.com/science/article/pii/S019689041200369X).

A. Angelotti et al. "Energy performance and thermal impact of a Borehole Heat Exchanger in a sandy aquifer: Influence of the groundwater velocity", Energy Conversion and Management, vol. 77, 2014, pp. 700-708, ISSN 0196-8904,https://doi.org/10.1016/j.enconman.2013.10.018. (https://www.sciencedirect.com/science/article/pii/S0196890413006535).

Huajun Wang et al. "Thermal performance of borehole heat exchanger under groundwater flow: A case study from Baoding", Energy and Buildings, vol. 41, Issue 12, 2009, pp. 1368-1373, ISSN 0378-7788, https://doi.org/10.1016/j.enbuild.2009.08.001. (https://www.sciencedirect.com/science/article/pii/S0378778809001820).

Nelson Molina-Giraldo et al.,"A moving finite line source model to simulate borehole heat exchangers with groundwater advection", International Journal of Thermal Sciences, vol. 50, Issue 12, 2011, pp. 2506-2513, ISSN 1290-0729, https://doi.org/10.1016/j.ijthermalsci.2011.06.012. (https://www.sciencedirect.com/science/article/pii/S129007291100192X).

Funabiki, A., Oguma, M., Yabuki, T., and Kakizaki, T., 2014, "The Effects of Groundwater Flow on Vertical-Borehole Ground Source Heat Pump Systems," ASME Paper No. ESDA2014-20065.

Goetzler, William, Zogg, Robert, Lisle, Heather, and Burgos, Javier. Ground-Source Heat Pumps. Overview of Market Status, Barriers to Adoption, and Options for Overcoming Barriers. United States: N. p., 2009. Web doi:10.2172/1219308.

Communication pursuant to Rules 161(2) and 162 EPC dated Apr. 4, 2023, for corresponding European Application No. 21862828.7, 4 pages.

Communication pursuant to Rules 161(2) and 162 EPC dated May 10, 2023, for corresponding European Application No. 21876293.8, 3 pages.

Communication pursuant to Rules 70(2) and 70a(2) EPC from European Patent Application No. 21862828.7, dated Nov. 11, 2024.

Communication pursuant to Article 94(3) EPC from European Patent Application No. 19828095.0, dated Nov. 11, 2024.

Office Action from Canadian Patent Application No. 3,121,511, dated Sep. 26, 2024.

Office Action from Canadian Patent Application No. 3,198,196, dated Sep. 25, 2024.

Office Action from Canadian Patent Application No. 3,193,648, dated Sep. 24, 2024.

Extended European Search Report from European Patent Application No. 21862828.7, dated Oct. 24, 2024.

\* cited by examiner

SPOOL-TYPE PITLESS ADAPTER FOR GROUNDWATER HEAT EXCHANGER

CROSS-REFERENCE TO RELATED APPLICATION

This Application is a Section 371 National Stage Application of International Application No. PCT/US2021/052397, filed Sep. 28, 2021 and published as WO 2022/072343 A1 on Apr. 7, 2022, in English, which claims the benefit of U.S. Provisional Application Ser. No. 63/084,646 which was filed Sep. 29, 2020; the contents of all of which are hereby incorporated by reference in their entirety.

FIELD

Embodiments of the present disclosure are generally related pitless adapters for groundwater heat exchangers that are submersed within groundwater of a well or a borehole for use by a heating and/or cooling system.

BACKGROUND

Heating and cooling systems generally move thermal energy from one location to another, such as moving thermal energy from a heat source to a heat sink (for example, a region of higher temperature to a region of lower temperature), or from a heat sink to a heat source (for example, a region of lower temperature to a region of higher temperature). Some heating and cooling systems utilize a heat pump. Heat pumps perform a refrigeration cycle using a circulating refrigerant to move heat through evaporation (heat absorption) and condensation (heat rejection) phases. The evaporation and condensation phases of the refrigerant typically takes place in two different units called the evaporator and condenser, respectively. In a heat pump, the evaporator is switched to be a condenser and vice versa depending on whether cooling or heating is required.

Geothermal or ground source heat pumps use the earth as a heat source or heat sink. A heat exchanger is positioned underground to provide cooling by using the earth as a heat sink, or to provide heating by using the earth as a heat source. The ground loops of most traditional geothermal heat pump systems focus on heat exchange via conduction with subsurface rocks and sediments, and do not systematically take advantage of heat exchange with flowing or stationary groundwater.

PCT publication number WO2020/117946 and PCT international application number PCT/US21/47962, which are incorporated herein by reference in their entirety, disclose groundwater heat exchangers that are used within a well, a geothermal borehole, etc., to exchange heat with the earth and/or groundwater. The well, borehole, etc., may be installed vertically, horizontally, or at any angle between, and it may be cased with pipe, uncased, partially cased, screened, unscreened, or any combination thereof.

SUMMARY

Embodiments of the present disclosure generally relate to pitless adapters for handling the exchange of the loop fluid flows between a heat pump and the one or more groundwater heat exchangers, and systems that utilize the pitless adapters. One embodiment of the pitless adapter includes a casing and a spool, which is removably received within an interior cavity of the casing. The casing includes a first port and a second port. The spool includes a top plate, a bottom plate, and a middle plate between the top and bottom plates. The bottom plate includes a first port and a second port. The casing, the top plate and the middle plate define a first chamber that is open to the first port of the casing and the first port of the spool. The casing, the middle plate and the bottom plate define a second chamber that is open to the second port of the casing and the second port of the spool. A first fluid pathway extends from the first port of the spool through the second chamber and the middle plate to the first chamber. A second fluid pathway extends from the second port of the spool to the second chamber.

In some embodiments, the spool includes a first tube extending from the bottom plate at the first port of the spool to the middle plate, and the first fluid pathway extends through the first tube. The first tube may include a perforated tubing section extending between the middle plate and the top plate and into the first chamber, and the first fluid pathway may extend through the perforated tubing section of the first tube.

The spool may include a second tube including a perforated tubing section extending from the bottom plate at the second port of the spool through the second chamber to the middle plate, and the second fluid pathway extends through the perforated tubing section of the second tube. The second tube may extend from the middle plate, through the first chamber to the top plate.

In some embodiments, the spool includes at least one pass-through tube extending from an opening in the top plate through an opening in the middle plate to an opening in the bottom plate.

The top plate, the middle plate and the bottom plate may each include an annular groove, and the pitless adapter may include an O-ring in each annular groove that forms a seal between the corresponding plate and an interior wall of the casing.

In some embodiments, the casing includes a cylindrical wall, and the first port and the second port of the casing each include an opening in the cylindrical wall.

Another embodiment of the pitless adapter includes a casing and a spool, which is removably received within an interior cavity of the casing. The casing includes a first port, a second port and a third port. The spool includes a top plate, a bottom plate, a first middle plate between the top and bottom plates, and a second middle plate between the first middle plate and the bottom plate. The bottom plate includes first, second and third ports. The casing, the top plate and the first middle plate define a first chamber that is open to the first port of the casing and the first port of the spool. The casing, the first middle plate and the second middle plate define a second chamber that is open to the second port of the casing and the second port of the spool. The casing, the second middle plate and the bottom plate define a third chamber that is open to the third port of the casing and the third port of the spool. A first fluid pathway extends from the first port of the spool through the third chamber, the second middle plate, the second chamber, and the first middle plate to the first chamber. A second fluid pathway extends from the second port of the spool through the third chamber, and the second middle plate to the second chamber. A third fluid pathway extends from the third port of the spool to the third chamber.

In some embodiments, the spool includes a first tube extending from the bottom plate at the first port of the spool through the third chamber, the second middle plate, and the second chamber to the first middle plate, and the first fluid pathway extends through the first tube. The first tube may include a perforated tubing section extending between the first middle plate and the top plate and into the first chamber, and the first fluid pathway may extend through the perforated tubing section of the first tube.

In some embodiments, the spool includes a second tube extending from the bottom plate at the second port of the spool through the third chamber to the second middle plate, and the second fluid pathway extends through the second tube.

The second tube may include a perforated tubing section extending between the second middle plate and the first middle plate and into the second chamber, and the second fluid pathway may extend through the perforated tubing section of the second tube.

In some embodiments, the spool comprises a third tube having a perforated tubing section extending from the bottom plate at the third port of the spool through the third chamber to the second middle plate, and the third fluid pathway extends through the third tube.

The spool may include at least one pass-through tube extending from an opening in the top plate through an opening in the first middle plate and an opening in the second middle plate to an opening in the bottom plate.

The top plate, the first middle plate, the second middle plate and the bottom plate may each include an annular groove, and the pitless adapter may include an O-ring in each annular groove that forms a seal between the corresponding plate and an interior wall of the casing.

In some embodiments, the casing includes a cylindrical wall, and the first port, the second port and the third port of the casing each comprise an opening in the cylindrical wall.

One embodiment of the system includes a pitless adapter and a groundwater heat exchanger. The pitless adapter includes a casing having a first port and a second port, and a spool removably received within an interior cavity of the casing. The spool includes a top plate, a bottom plate, a middle plate between the top and bottom plates, and a first port and a second port in the bottom plate. The casing, the top plate and the middle plate define a first chamber that is open to the first port of the casing and the first port of the spool. The casing, the middle plate and the bottom plate define a second chamber that is open to the second port of the casing and the second port of the spool. A first fluid pathway extends from the first port of the spool through the second chamber and the middle plate to the first chamber. A second fluid pathway extends from the second port of the spool to the second chamber. The groundwater heat exchanger includes a first port and a second port, and is configured to exchange heat between a fluid flow received from the first or second port of the spool with groundwater in which the groundwater heat exchanger is submerged. A first pipe connects the first port of the groundwater heat exchanger to the first port of the spool. A second pipe connects the second port of the groundwater heat exchanger to the second port of the spool.

In some embodiments, the spool comprises a first tube extending from the bottom plate at the first port of the spool to the middle plate, and the first fluid pathway extends through the first tube.

In some embodiments, the spool includes a second tube including a perforated tubing section extending from the bottom plate at the second port of the spool through the second chamber to the middle plate, and the second fluid pathway extends through the perforated tubing section of the second tube.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
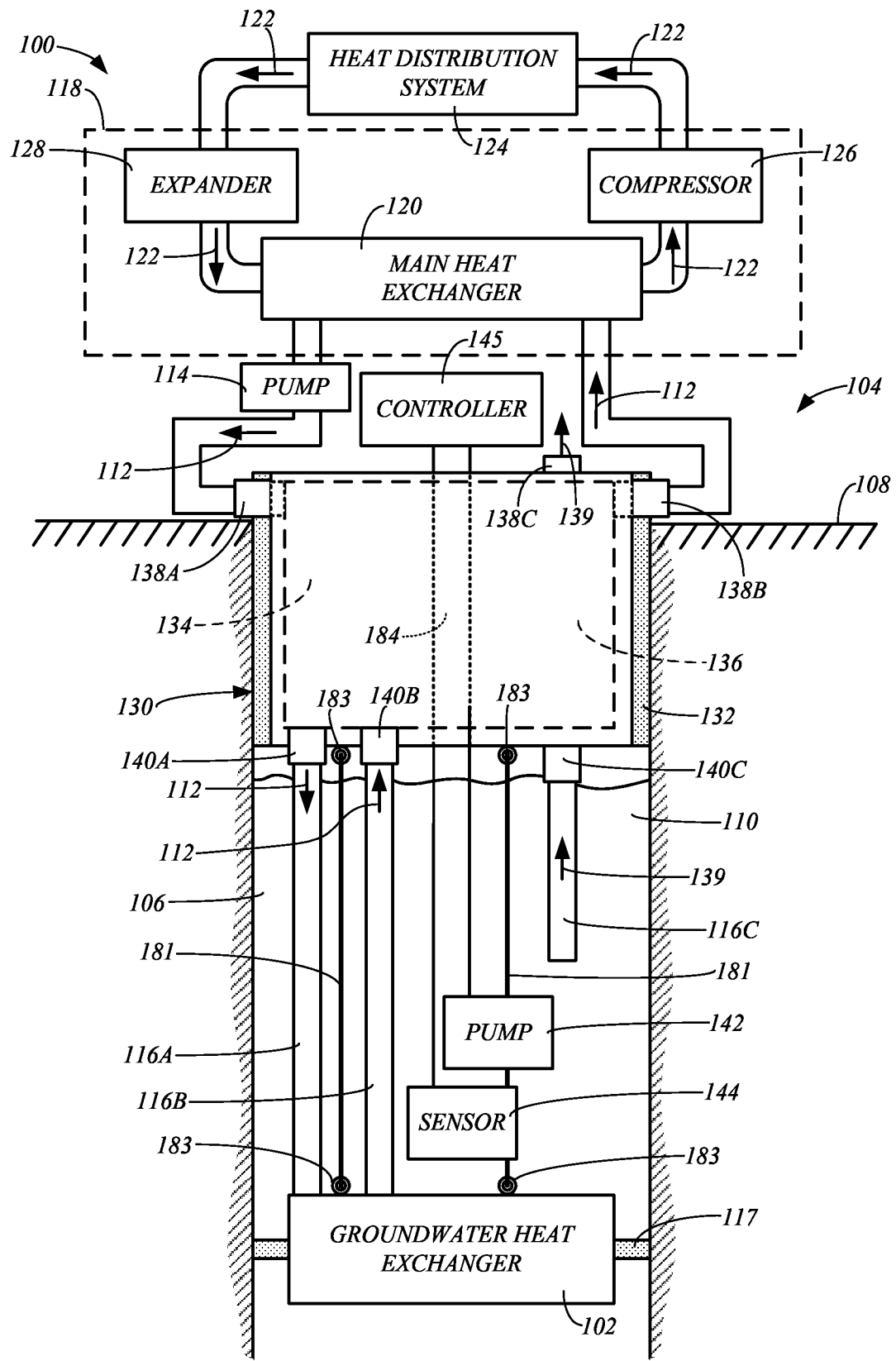
FIG. 1 is a simplified diagram of a geothermal heat pump system that includes a pitless adapter, in accordance with embodiments of the present disclosure.

Embodiments of the present disclosure generally relate to a pitless adapter for groundwater heat exchangers, which are configured for use in a geothermal heat pump system, such as that disclosed in the above-referenced PCT application, and may be configured for use within wells or geothermal boreholes to exchange heat with the earth and/or groundwater. Embodiments of the pitless adapter can, for example, simplify the installation and maintenance of the heat exchangers of the geothermal heat pump system.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or may be shown in block diagram form in order to not obscure the embodiments in unnecessary detail.

FIG. 1 is a simplified diagram of a geothermal heat pump system 100 including one or more groundwater heat exchangers 102, in accordance with embodiments of the present disclosure. The system 100 generally includes a ground loop 104 that extends into a vertical borehole or well 106 (hereinafter "borehole") below the ground surface 108. The borehole 106 may penetrate one or more aquifers or aquifer or groundwater zones whereby groundwater 110 is present in the borehole 106, such as described in the above-referenced PCT applications. When a borehole is used, it may have a diameter of approximately 3-24 inches, such as 4, 6, 8 or 10 inches, for example. If a well is used, it may be formed much larger than a typical borehole.

The ground loop 104 includes one or more groundwater heat exchangers 102, each of which is positioned within the borehole 106 and is submerged within the groundwater 110. A loop fluid flow 112 (e.g., water, refrigerant, etc.) that may be driven by a loop pump 114 through piping 116 of the ground loop 104, such as pipes 116A and 116B. The loop fluid flow 112 is driven through each heat exchanger 102, which operates to exchange heat between the loop fluid flow 112 and the groundwater 110.

One or more packers 117 may be used to secure each heat exchanger 102 within the borehole 106, as shown in FIG. 1. Such packers may also seal off lower sections of the borehole 106 from upper sections. The packers 117 may be designed to allow power cables and other wires (e.g., sensor wires) to pass through.

In one embodiment, the piping 116 of the ground loop 104 forms a closed loop of piping, and does not extract groundwater or carry groundwater to the surface. Separate piping (not shown) may be used to capture and return subsurface groundwater 110 to the surface for use (e.g., consumption).

The pipes 116A and 116B that extend below the surface 108 may be thermally insulated to reduce heat exchange with their surroundings and isolating the heat exchange with the fluid flow 112 to the one or more groundwater heat exchangers 102. Thus, rather than providing heat exchange along nearly the entire length of the borehole 106, embodiments of the system 100 provides heat exchange with the groundwater 110 at the one or more groundwater heat exchangers 102 within the borehole 106.

The system 100 may comprise a heat pump 118 that includes a main heat exchanger 120 that is configured to exchange heat between a fluid flow 122 (e.g., water, refrigerant, etc.), which also flows through a heat distribution system 124, and the loop fluid flow 112, as indicated in FIG. 1, using any suitable technique. The heat distribution system 124 may use the fluid flow 122 to provide heating or cooling for a water heater, an HVAC, a chiller, a heat recovery chiller, or another device in accordance with conventional techniques. Alternatively, the system 100 may operate without the main heat exchanger 120, and utilize the loop fluid flow 112 to directly heat or cool a desired medium.

The heat pump 118 may also include conventional heat pump components, such as a compressor 126, an expander 128, and/or other conventional components, as shown in FIG. 1, to perform a desired heat pump cycle. While the compressor 126 and the expander 128 are illustrated as performing a heating cycle based on the direction of the fluid flow 122, it is understood that the direction of the fluid flow 122 may be reversed to perform a cooling cycle.

In some embodiments, control and/or balancing valving may be connected to the pipes 116 at a location between the heat exchanger 102 and the heat pump 118 or heat distribution system 124. The valving may be mechanically or electronically controlled, and may be used to match heating and/or cooling load demand from the heat distribution system 124 with the supply from the heat exchanger 102, for example. The valving may include a bypass connecting the pipes 116A and 116B that may be used to provide additional control of the loop fluid flow 112.

Each groundwater heat exchanger 102 may be formed in accordance with the heat exchangers disclosed in the above-referenced PCT applications. In general, each heat exchanger 102 includes a closed fluid pathway that receives the loop fluid flow 112 from the system 100, such as through the pipe 116A, and discharges the loop fluid flow 112 to the pipe 116B to return the loop fluid flow 112 back to the system 100, such as back to the heat pump 118. As the loop fluid flow 112 travels through the fluid pathway of each groundwater heat exchanger 102, heat is exchanged between the loop fluid flow 112 and the groundwater 110, in which the groundwater heat exchanger 102 is submerged.

Embodiments of the present disclosure are directed to a spool-type pitless adapter 130 for handling the exchange of the loop fluid flows 112 between the heat pump 118 and the one or more groundwater heat exchangers 102. A simplified illustration of an example of a pitless adapter 130 formed in accordance with embodiments of the present disclosure is provided in FIG. 1.

The pitless adapter 130 may be positioned at or near the top of the borehole 106, or within the borehole 106. The pitless adapter 130 generally includes a housing or casing 132 and a spool 134. The casing 132 may be secured to a wall of the borehole 106 or to a riser pipe that extends to the surface to prevent water from entering the top side of the adapter 130. The casing 132 includes an interior cavity 136, in which the spool 134 is received.

The casing 132 may include two or more ports 138, such as ports 138A and 138B, that are configured to receive and discharge the loop fluid flow 112. In some embodiments, the casing 132 includes additional ports, such as port 138C for receiving a separate fluid flow 139, such as a flow of the groundwater 110, which may be used as potable or process water, or a flow of a combination of the fluid flow 112 and the groundwater 110. The ports 138 may be located above the ground surface 108 (FIG. 1), the ports 138 may be within the borehole 6 (e.g., 6-7 feet below the surface 108), or some of the ports 138 may be located above the ground surface 108, while other ports 138 are located within the borehole 106 and below the ground surface 108.

The casing 132 and the spool 134 may be formed of any suitable material. In some embodiments, the casing 132 and/or the spool 134 are constructed of materials that are not chemically reactive to common fluids such as potable water that may pass through them, such as PVC, mild steel, stainless steel, and brass.

The spool 134 may have multiple ports 140, such as ports 140A and 140B, through which the flows 112 are discharged to the heat exchanger 102 or received from the heat exchanger 102. Additional ports 140 may be used to connect the flows 112 to other heat exchangers, or to receive a flow 139 of the groundwater 110, as indicated by port 140C.

In some embodiments, the spool 134 is removably attached to the casing 132. Due to the connections to the one or more heat exchangers 102, such as through the pipes 116, the removal of the spool may also facilitate the removal of the heat exchanger 102 and other components, such as pumps 142 for circulating the groundwater 110, sensors 144 for detecting a temperature of the groundwater 110, and/or other components, for example.

Figure 2:
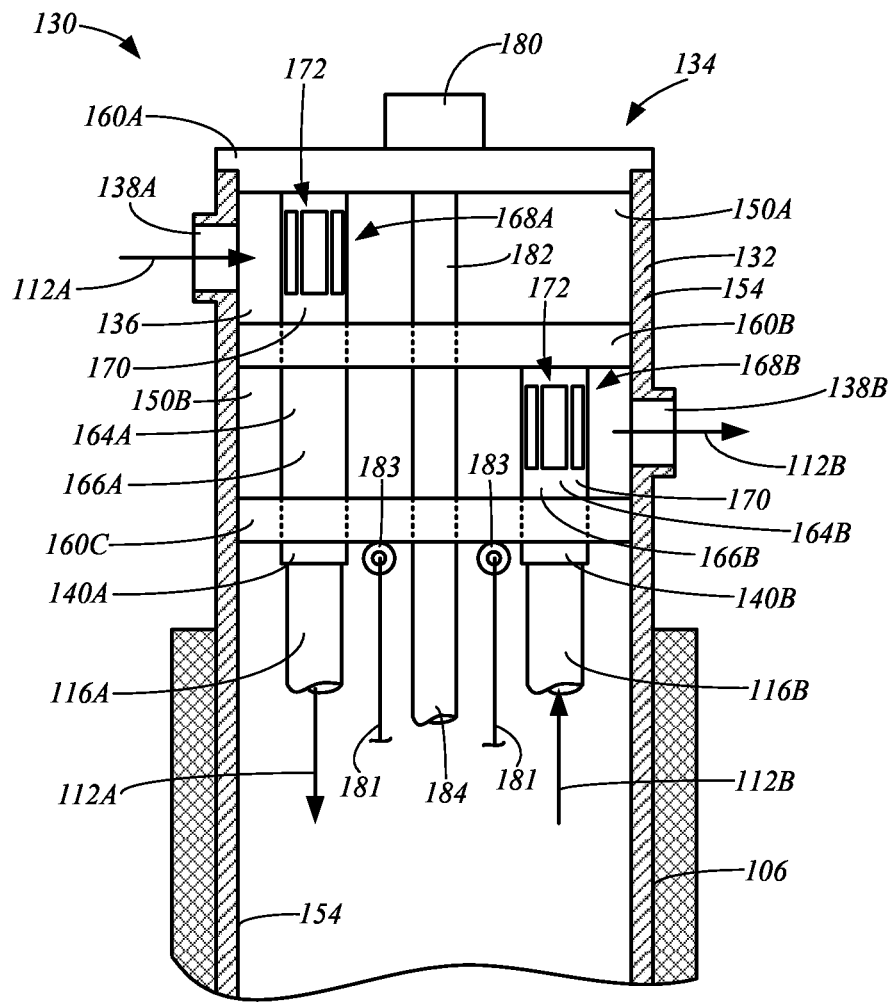
FIG. 2 is a simplified cross-sectional view of a two-port pitless adapter installed in a borehole, in accordance with embodiments of the present disclosure.
Figure 3:
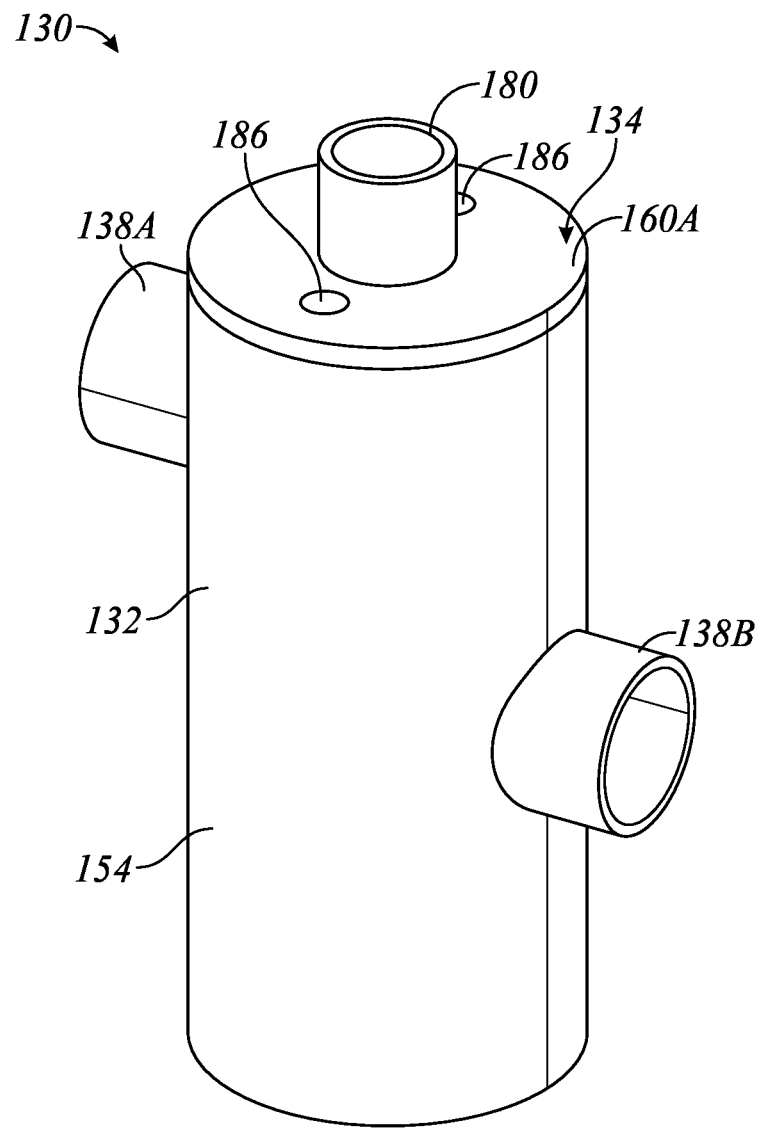
FIG. 3 is an isometric view of an example of a two-port pitless adapter, in accordance with embodiments of the present disclosure.
Figure 4:
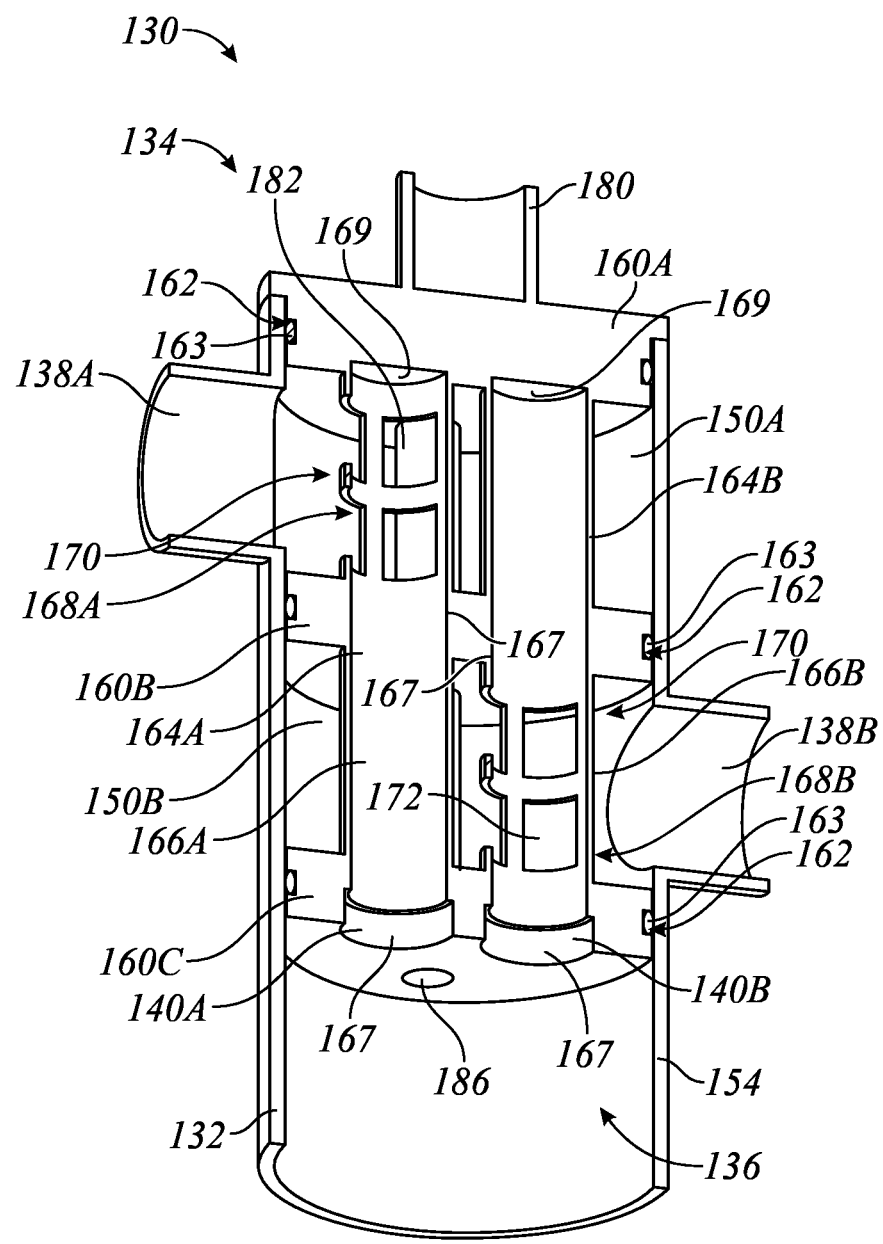
FIG. 4 is a cross-sectional view of the two-port pitless adapter of FIG. 3, in accordance with embodiments of the present disclosure.
Figure 5:
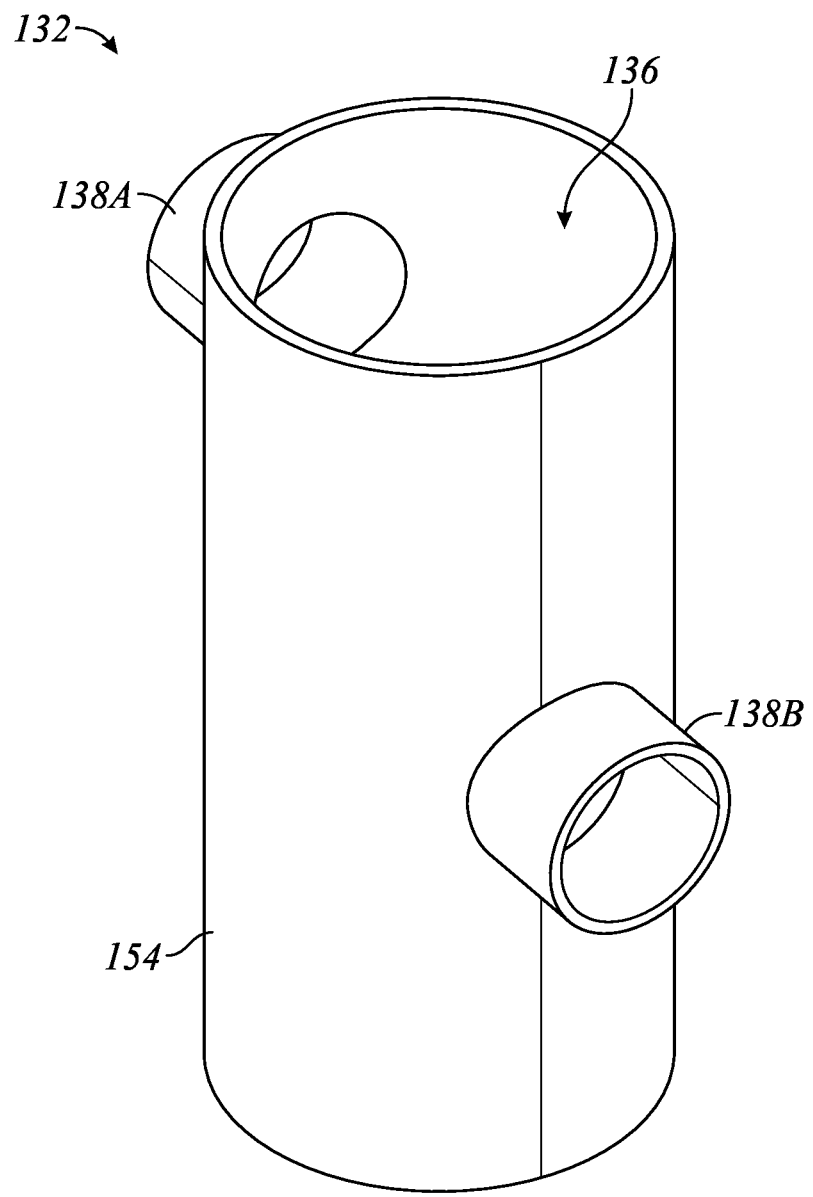
FIG. 5 is an isometric view of a casing of the pitless adapter of FIG. 3, in accordance with embodiments of the present disclosure.
Figure 6:
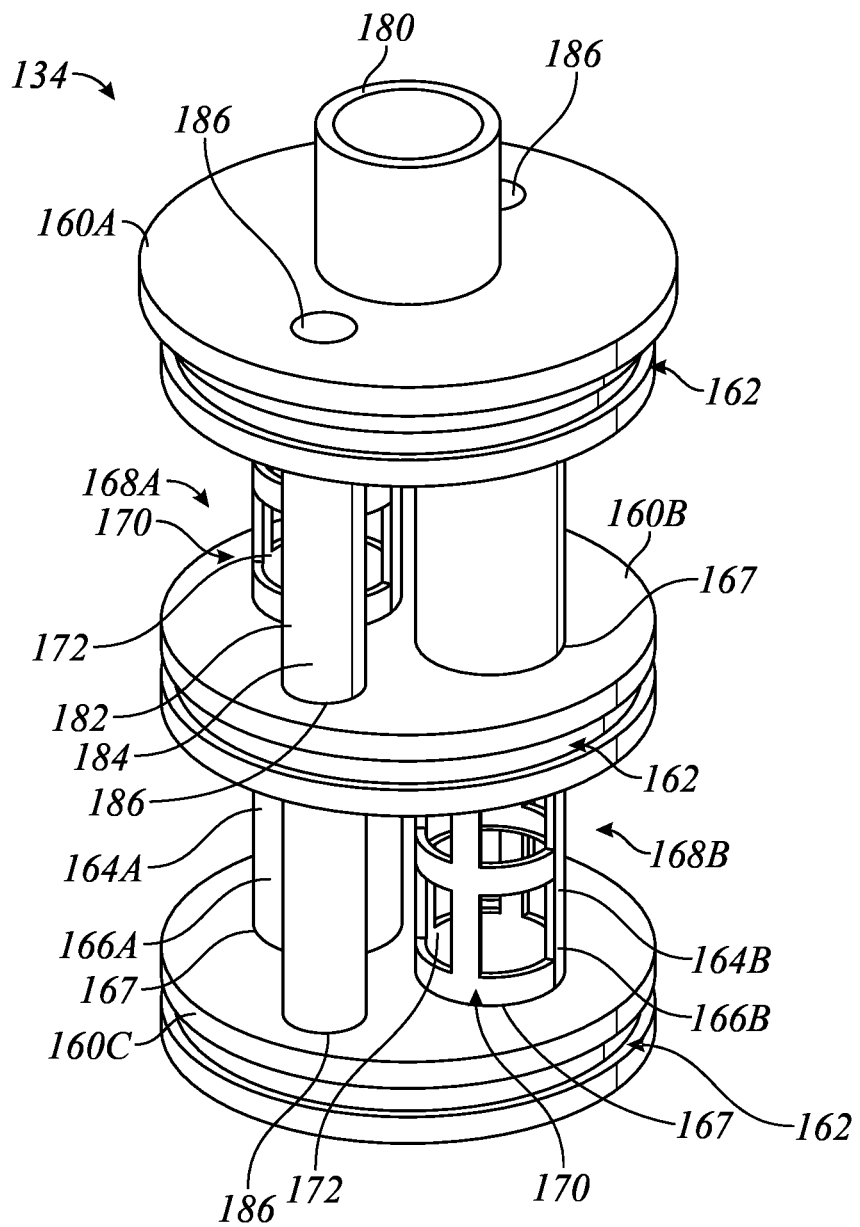
FIGS. 6 and 7 are top and bottom isometric views of an example of a spool of the pitless adapter of FIG. 3, in accordance with embodiments of the present disclosure.
Figure 7:
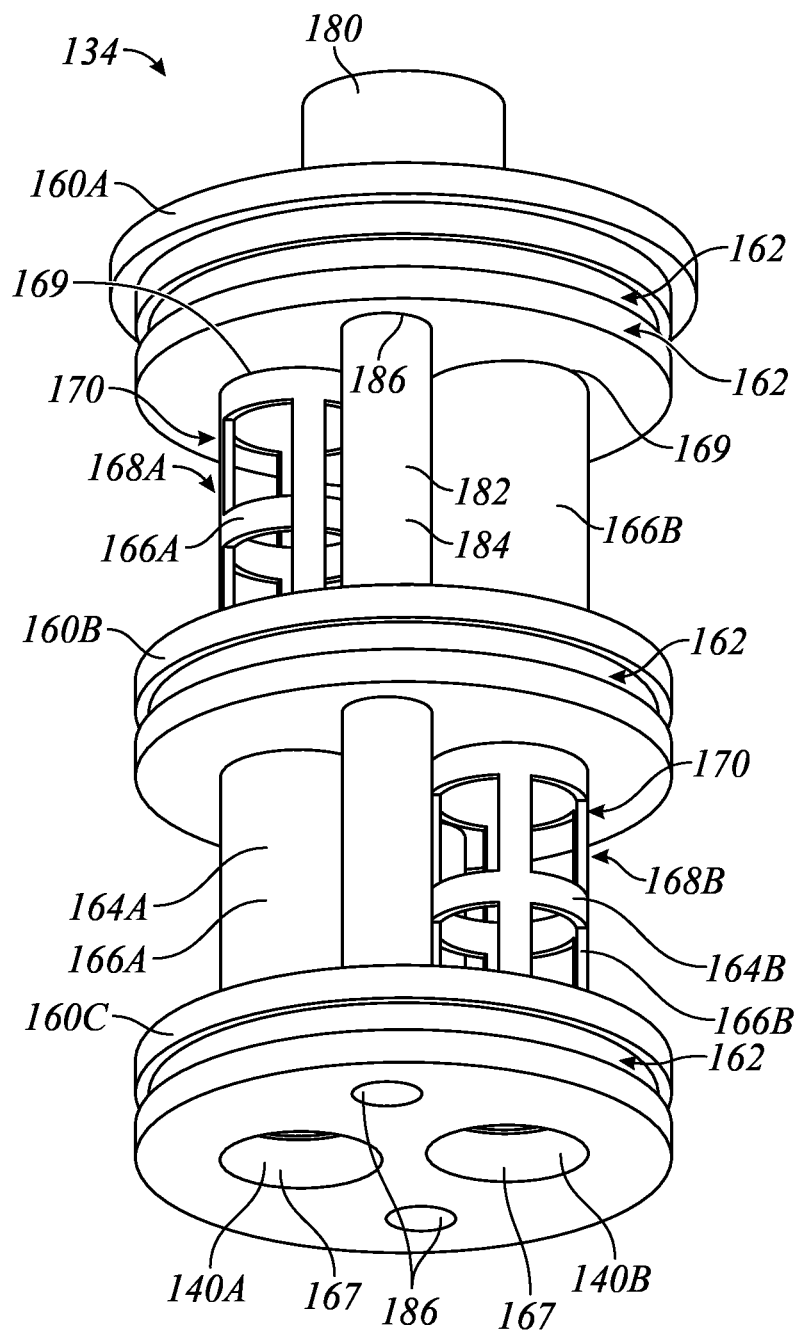
Figure 8:
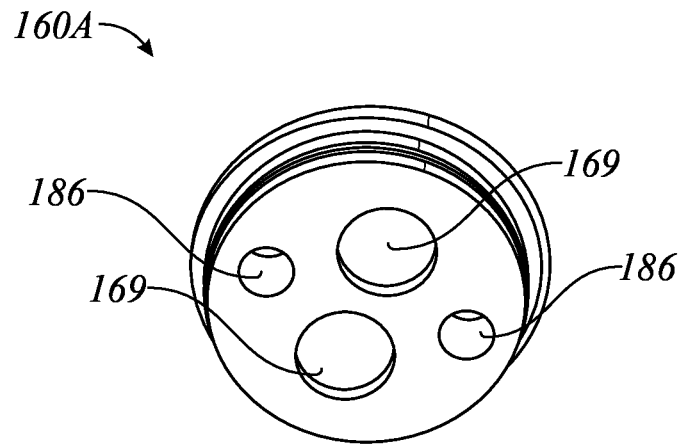
FIG. 8 is a bottom isometric view of an example of a top plate of the spool of FIGS. 6 and 7, in accordance with embodiments of the present disclosure.
Figure 9:
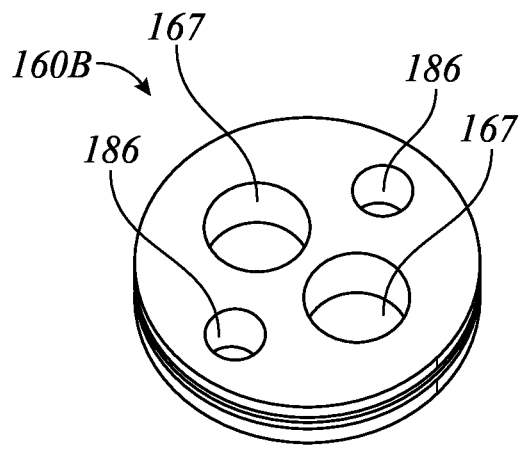
FIG. 9 is a top isometric view of an example of a middle plate of the spool, in accordance with embodiments of the present disclosure.
Figure 10:
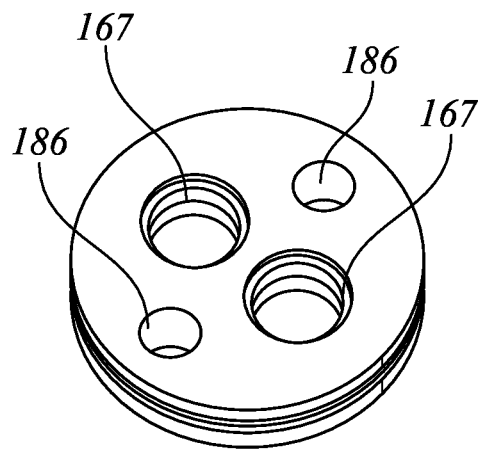
FIG. 10 is a top isometric view of an example of a bottom plate of the spool, in accordance with embodiments of the present disclosure.

An example of a two-port pitless adapter 130 will be described with reference to FIGS. 2-10. FIG. 2 is a simplified cross-sectional view of a two-port pitless adapter 130 installed in a borehole 106, in accordance with embodiments of the present disclosure. FIG. 3 is an isometric view of an example of the pitless adapter 130, in accordance with embodiments of the present disclosure. FIG. 4 is a cross-sectional view of the pitless adapter 130 in accordance with embodiments of the present disclosure. FIG. 5 is an isometric view of the casing 132 of the pitless adapter 130, in accordance with embodiments of the present disclosure. FIGS. 6 and 7 are isometric views of an example of a spool 134 of the pitless adapter 130, in accordance with embodiments of the present disclosure. FIG. 8 is a bottom isometric view of an example of a top plate 160A of the spool 134, FIG. 9 is a top isometric view of a middle plate 160B of the spool 134, and FIG. 10 is a top isometric view of a bottom plate 160C of the spool 134, in accordance with embodiments of the present disclosure.

In the provided example, the casing 132 of the pitless adapter 130 includes two ports 138A and 138B for receiving and discharging the loop fluid flows 112, and the spool 134 includes two ports 140A and 140B for coupling the fluid flows 112 to one or more heat exchangers 102. In some embodiments, the spool 134 includes a distinct chamber 150 for each of the ports 138.

In the example pitless adapter 130 of FIG. 2, the spool 134 includes a chamber 150A corresponding to the port 138A, and a chamber 150B corresponding the port 138B. Each of the chambers 150 of the spool 134 may be defined by plates 160 of the spool 134 and the wall 154 (FIG. 5) of the casing 132, which may take the form of a cylindrical wall. For example, the chamber 150A is defined by the wall 154 of the casing 132, a top plate 160A of the spool 134, and a middle plate 160B of the spool 134. Similarly, the chamber 150B is defined by the wall 154 of the casing 132, the middle plate 160B and a bottom plate 160C of the spool 134.

Each of the chambers 150 may be sealed using any suitable technique. For example, 0-rings 163 (e.g., within annular grooves 162 of the plates 160 (FIG. 7)), gaskets, or other suitable sealing components may be used to form seals between the plates 160 and the casing 132. In one embodiment, a dielectric seal is formed between the components of the spool 134, such as the plates 160, and the casing 132, such as when the plates 160 are formed of stainless steel and the casing 132 is formed of mild steel to prevent corrosion.

In some embodiments, the spool 134 includes fluid pathways 164 that fluidically connect the chambers 150 to their corresponding ports 140. The fluid pathways 164 may be formed using tubing 166 that extends through one or more of the plates 160 of the spool 134. For example, a tube 166A may form a fluid pathway 164A (FIGS. 2, 6 and 7) that extends through an opening 167 (FIG. 9) in the plate 160B and an opening 167 in the plate 160C and connects the chamber 150A to the port 140A (FIG. 2), and a tube 166B may form a fluid pathway 164B (FIGS. 2, 6 and 7) that extends through an opening 167 (FIG. 10) in the plate 160C and connects the chamber 150B to the port 140B, as shown in FIG. 4. It is understood that the tubes 166A and 166B may be formed by tubing sections that connect to corresponding openings 167 (FIGS. 6 and 7) in the plates 160B and/or 160C, such as using appropriate connectors or fittings. A suitable seal may be formed between the tubes 166 forming the fluid pathways 164 and the corresponding plates 160 to seal the fluid pathways 164.

One or more of the tubes 166 may be used to connect the plates 160 of the spool 134 together, such that the spool 134 may be handled as a single unit. For example, the tube 166A and/or 166B (FIGS. 2, 6 and 7) or a corresponding section thereof, may be attached to the plate 160A, such as at an opening or a closed socket 169 (FIG. 8). The tube 166A and/or 166B may also be attached to the plates 160B and 160C. This improves the rigidity of the structure, which is useful when inserting the spool 134 into the interior cavity 136 of the casing 132.

In some embodiments, the fluid pathways 164 include a port 168 within the corresponding chamber 150, through which the fluid flow 112 travels. For example, the fluid pathway 164A may include a port 168A within the chamber 150A, and the fluid pathway 166B may include a port 168B within the chamber 150B, as shown in FIG. 2. Each of the ports 168 operates to either receive the fluid flow 112 from within the chamber 150, or discharge the fluid flow 112 within the chamber 150. In one embodiment, the ports 168 each comprise a perforated tubing section 170 having perforations or openings 172, through which the fluid flow 112 may travel.

Thus, in operation, a fluid flow 112A may be received at the port 138A, through which it is introduced to the chamber 150A, as shown in FIG. 2. That fluid flow 112A then travels through the port 168A of the fluid pathway 164A, from which it travels to the port 140A where it is coupled to the pipe 116A, where it is delivered to one or more heat exchangers 102. As mentioned above, each heat exchanger 102 includes a fluid pathway that circulates the received loop fluid flow 112A. Heat is exchanged between the circulating loop fluid flow 112A and the groundwater 110, in which the groundwater heat exchanger 102 is submerged.

After this heat exchange, the loop fluid flow 112A is returned as loop fluid flow 112B from the one or more heat exchangers 102 through the pipe 116B to the port 140B. The loop fluid flow 112B then travels through the fluid pathway 164B and into the chamber 150B through the port 168B, as indicated in FIG. 2. The loop fluid flow 112B may then be discharged through the port 138B and returned to the main heat exchanger 120 (FIG. 1).

In some embodiments, the ports 140A and 140B include suitable connectors or fittings for coupling the pipes 116A and 116B to the ports 140A and 140B, such as a weldolet, a threadolet, or another suitable connector.

In one embodiment, the ports 140A and 140B are configured to couple to the same diameter piping 116. This generally limits the diameter of the pipes 116A and 116B to approximately 3 inches for a 10-inch bore 106, or 2 inches for an 8-inch bore 106, due to the size of the joints at the ports 140A and 140B, for example.

Alternatively, the ports 140A and 140B may be configured to couple to different diameter piping 116, such that pipe 116A has a different diameter than the pipe 116B to increase or maximize the total combined cross-sectional area of the pipes 116A and 116B relative to when the pipes 116A and 116B have the same diameter. For example, when the borehole 106 has a 10-inch diameter, one of the ports 140A and 140B may be configured to accommodate a 4-inch pipe 116, while the other is configured to accommodate a 3-inch pipe 116. Similarly, when the borehole 106 has an 8-inch diameter, one of the ports 140A and 140B may be configured to accommodate a 3-inch pipe 116, while the other is configured to accommodate a 2-inch pipe 116, for example. The resulting increase in the total cross-sectional area of the pipes 116 may result in a significant pressure drop reduction over the corresponding configuration using piping 116 having the same diameter. Additionally, the use of differently sized ports 140A and 140B limits the attachment of the pipes 116A and 116B to a single configuration, thus ensuring that the pipes 116 are connected to the correct ports.

In some embodiments, the top plate 160A may include a connector 180, such as, for example, a female pipe thread (FPT) coupling at its center, to which a pipe may be connected when it is desired to remove the spool 134 from the casing 132, such as when the pitless adapter 130 is positioned beneath the surface 108 within the borehole 106. Thus, a pipe may be extended below the surface 108 into the borehole 106 and screwed into the connector 180, and used to remove the spool 134 from the casing 132 along with the attached heat exchangers 102 and other components (e.g., pump 142, sensors 144, etc.).

In some embodiments, one or more cables 181 connect the spool 134 to the heat exchanger 102, as shown in FIG. 1. The cables 181 operate to support and secure the position of the heat exchanger 102 within the borehole 106, and reduce stress on the pipes 116 during use of the heat exchanger 102 and during the removal of the heat exchanger 102 with the spool 134. The cables 181 may be attached to the spool 134 using any suitable technique, such as eye loops 183 attached to the bottom plate 160C, for example, as shown in FIG. 2. A similar technique may be used to attach the cables 181 to the heat exchanger 102, as indicated in FIG. 1.

In some embodiments, the spool 134 includes one or more pass-throughs 182, through which power cables, wires (e.g., sensor wires) and other components may be fed from components above the surface 108 (e.g., power supplies, a controller 145, etc.) to pumps 142, sensors 144, and/or other components located within the borehole 106, for example, as indicated in FIG. 1. Each pass-through 182 may be formed by tubing 184 that extends through the plates 160, such as through openings 186 (FIGS. 8-10) in the plates 160, or tubing sections that connect to the plates 160. The tubing 184 may be attached to each of the plates 160 to connect the plates 160 together and fix the assembly of the spool 134.

In one example configuration of the pitless adapter 130, the top plate 160A may be 2 inches thick. The top 0.5 inch may have an outer diameter of 8.625 inch, and the next 0.45 inch may have an outer diameter of 7.9 inches, thereby creating a shoulder that abuts the top of the casing 132 when the spool 134 is fully installed in the cavity 136 (FIGS. 2 and 4). The next 0.6 inch (groove 162) may have an outer diameter of 7.2 inches, and the bottom 0.45 inch may have an outer diameter of 7.9 inches. Through holes 186 may be configured for 1-inch schedule 40 pass-through pipes (~1.315 inches) 184 that are 14 inches long, and the holes 186 may be opposite each other and 2.615 inches from center. The sockets or openings 169 may each be 0.25 inch deep placement pockets (on the bottom surface) for 2-inch schedule 40 pipes (~2.375 inches) 166 and may be opposite each other and 1.525 inches from center. The connector 180 on the top plate 160A may have a 2-inch FPT coupling centered on it (not for fluid flow).

One example of the middle plate 160B is 1.5 inches thick. The top 0.45 inch may have an outer diameter of 7.9 inches, the next 0.6 inch (groove 162) may have an outer diameter of 7.2 inches, and the bottom 0.45 inch may have an outer diameter of 7.9 inches. The through holes 186 may each be configured for 1-inch schedule 40 pipe (~1.315 inches) 184, and may be opposite each other and 2.615 inches from center. The through holes 167 may each be configured for a 2-inch schedule 40 pipe (~2.375 inches) 166, and may be opposite each other and 1.525 inches from center.

One example of the bottom plate 160C is 1.5 inches thick. The top 0.45 inch may have an outer diameter of 7.9 inches, the next 0.6 inch (groove 162) may have an outer diameter of 7.2 inches, and the bottom 0.45 inch may have an outer diameter of 7.9 inches. The through holes 186 may be configured for 1-inch schedule 40 pipe (~1.315 inches) 184 and may be opposite each other and 2.615 inch from center. The through holes 167 may be configured to match the outer diameter of 2-inch schedule 40 pipes (~2.067 inches) 166 and may be opposite each other and 1.525 inches from center. The top surface may include 0.25 inch deep placement pockets that are each configured for a 2-inch schedule 40 pipe (~2.375 inches) 166 and may be opposite each other and 1.525 inches from center. The bottom surface may include 0.75 inch deep placement pockets with 2-inch FPT configured for the 2-inch schedule 40 pipes 166, and the pockets may be opposite each other and 1.525 inches from center.

The wall 154 of the casing 132 may comprise an 8-inch schedule 40 pipe that is 20.5 inches long. The ports 138A and 138B may be 4.00 inch through holes for 3-inch FPT coupling, and may be 5.75 inches and 11.75 inches down from the top surface of the casing 132, and 180 degrees from each other circumferentially. Each port 138 may include a 3-inch FPT coupling that may be cut to have a smooth joint with the 8-inch pipe. The casing 132 may have a ring welded around its outside diameter at the top surface, which may be welded to a riser pipe with an inside diameter greater than the outside diameter of the casing.

As indicated above, the tubes 166 may each be a 2-inch schedule 40 pipe, that is approximately 13 inches long. The perforations or openings 172 of the tubing section 170 may run from 2.75 inch to 4.25 inches and 4.75 inches to 6.25 inches from the top surface for tube 166A, and may run from 0.75 inch to 2.25 inches and 2.75 inches to 4.25 inches from the bottom surface for tube 166B. The openings 172 may comprise 8 cut-outs total, 4 per row and, circumferentially, 22.5 degree webs and 67.5 degree cut-outs, for example.

This configuration results in chambers 150 where the top chamber is about 6.5 inches in height and the bottom chamber is about 4.5 inches in height measured along the central axis of the casing 130.

Clearance between each 7.9 inch plate and the 7.981 inch inner diameter of the 8 inch schedule 40 pipe forming the wall 154 of the casing 132 is intentional. This gap allows 0.5 inch O-rings 163 to be positioned in each groove 162 to seal the chambers 150 against the wall 154 of the casing 132, as shown in FIG. 4.

Figure 11:
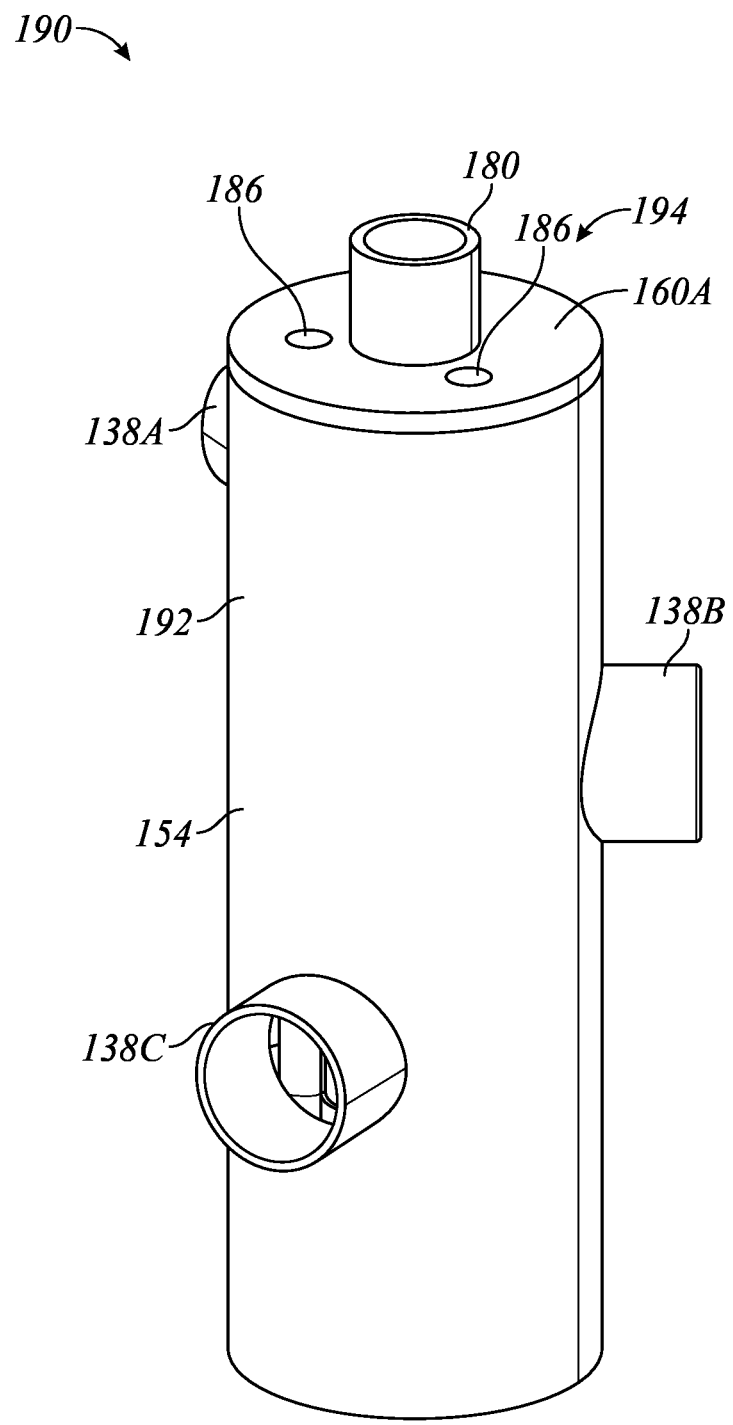
FIG. 11 is an isometric view of an example of a three-port pitless adapter, in accordance with embodiments of the present disclosure.
Figure 12:
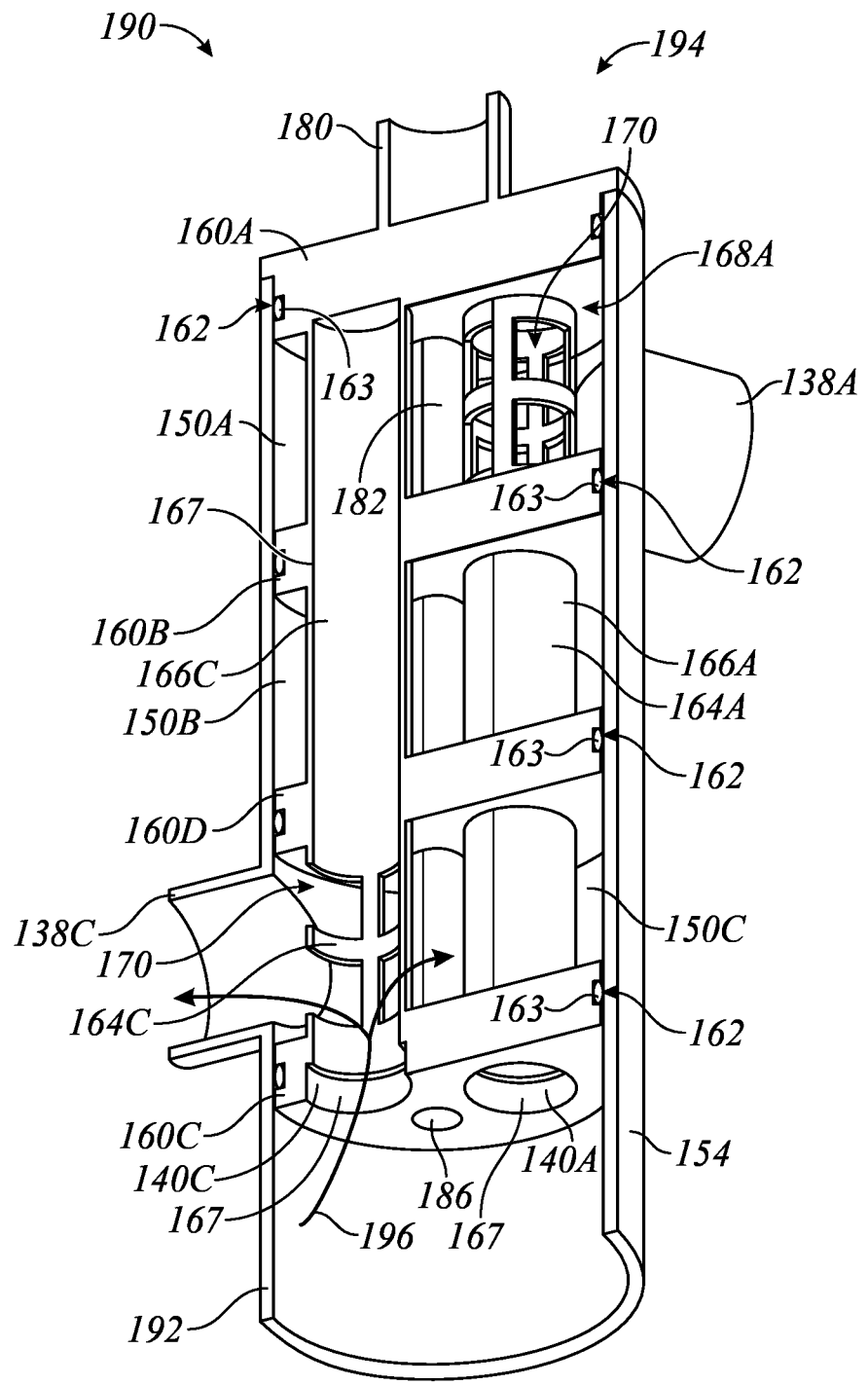
FIG. 12 is an isometric cross-sectional view of the pitless adapter of FIG. 11, in accordance with embodiments of the present disclosure.
Figure 13:
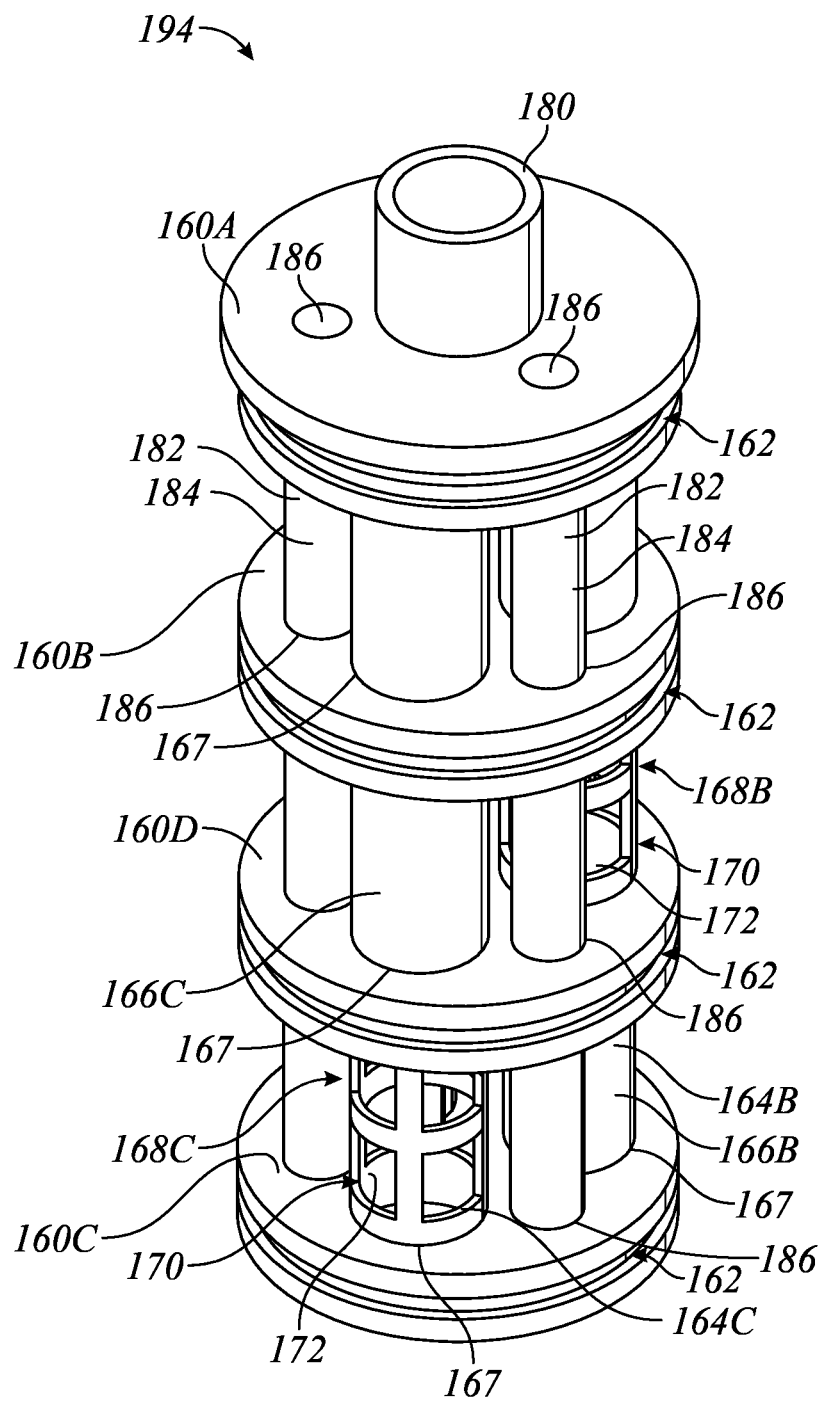
FIGS. 13 and 14 are top and bottom isometric views of a spool of the pitless adapter of FIG. 11, in accordance with embodiments of the present disclosure.
Figure 14:
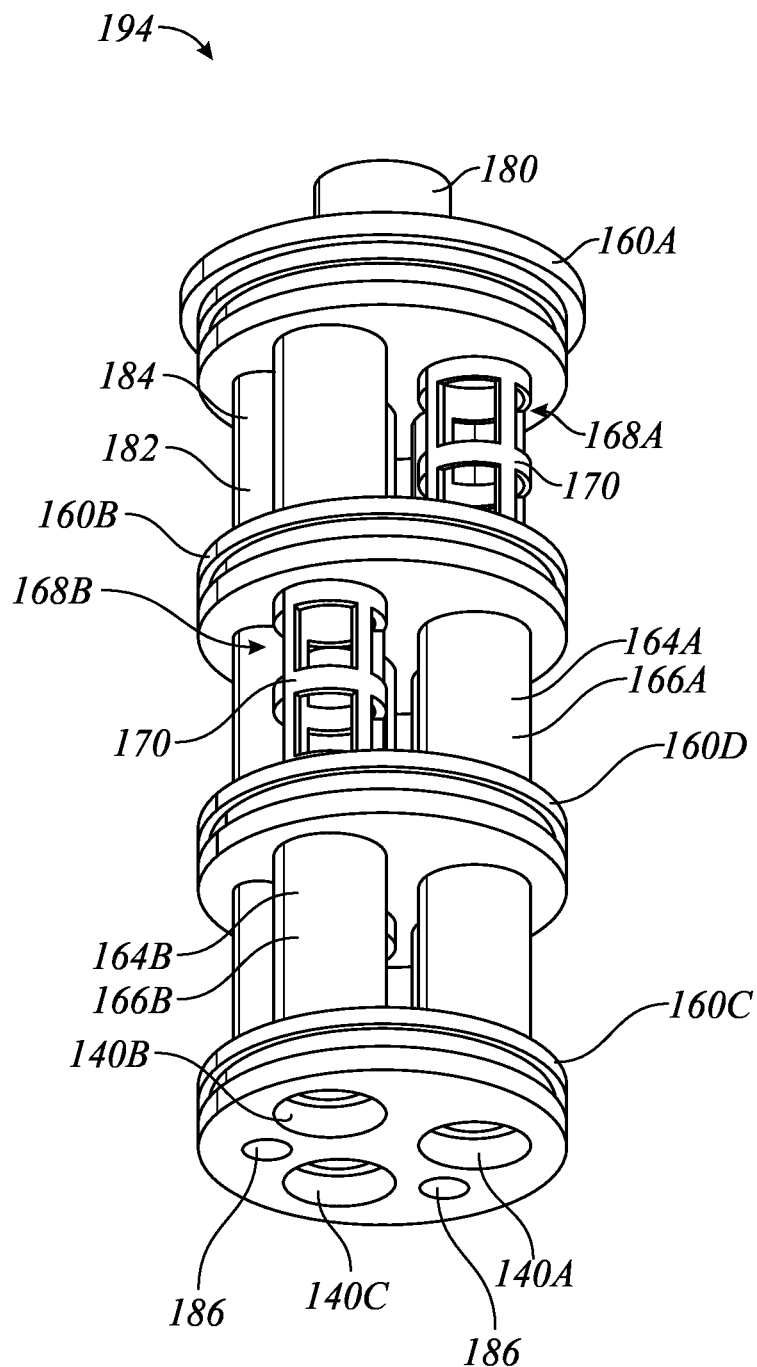

FIGS. 11-14 illustrate an example of a three-port pitless adapter 190, in accordance with embodiments of the present disclosure. FIG. 11 is an isometric view of the pitless adapter 190, FIG. 12 is an isometric cross-sectional view of the pitless adapter 190, and FIGS. 13 and 14 are isometric views of a spool of the pitless adapter 190, in accordance with embodiments of the present disclosure. Elements that are identified using the same or similar reference characters as those discussed above, generally refer to the same or similar elements.

The pitless adapter 190 comprises a casing 192 and a spool 194, which are similar to the casing 132 and the spool 134 of the pitless adapter 130. The casing 192 includes an additional port 138C over the ports 138A and 138B of the two-port pitless adapter 130. Additionally, the spool 194 includes a middle plate 160D positioned between the middle plate 160B and the bottom plate 160C of the two-port pitless adapter 130 example. As a result, in addition to the chambers 150A and 150B, the spool 194 includes a chamber 150C that is open to the port 138C. The chamber 150B is formed between the casing 192 and the plates 160B and 160D, and the chamber 150C is formed between the casing 192 and the plates 160C and 160D, as shown in FIG. 12. The spool 194 also includes a port 140C along with the ports 140A and 140B in the bottom plate 160C. The additional ports 138C, 140C and the additional chamber 150C allow the pitless adapter 190 to accommodate a third fluid flow into or out of the port 138C. In some embodiments, this fluid flow may be a flow of the groundwater 110 to the surface 108, for example, which may be used as potable water, process water, irrigation water, or another purpose.

In addition to the fluid pathways 164A and 164B connected to chambers 150A and 150B, the pitless adapter 190 includes a fluid pathway 164C that extends through the plate 160C, and may be coupled to a port 140C, which may in turn be connected to a pipe 116C (FIG. 1) that extends into the borehole 106. A fluid flow 196 (or 139 in FIG. 1) is directed between the port 138C and the port 140C, such as in the direction indicated by the arrows or the opposite direction. The fluid pathway 164C may be formed by tubing 166C and have similar features as the tubing 166A and 166B described above. The plates 160 of the spool 194 may be adapted to accommodate the tubing 166C in a similar manner as described above. The fluid flow 196 may be received by the port 140C, travel through the port 168C, into the chamber 150C and out through the port 138C, or travel in the opposite direction along this path.

The length of the casing 192 is extended relative to the casing 132 to accommodate the additional port 138C and chamber 150C and the plate 160D. The fluid pathways 164 and the pass-throughs 182 may be extended accordingly. Otherwise, similar dimensions apply for the components forming the pitless adapter 190, as those discussed above for the pitless adapter 130.

It is understood that the pitless adapter embodiment described above, may be further adapted to include additional ports 138 for accommodating one or more additional fluid flows, using similar techniques as those described herein. Thus, embodiments of the pitless adapter include two-port pitless adapters (e.g., pitless adapter 130), three-port pitless adapters (pitless adapter 190), or pitless adapters having four or more ports 138.

Although the embodiments of the present disclosure have been described with reference to preferred embodiments, workers skilled in the art will recognize that changes may be made in form and detail without departing from the spirit and scope of the present disclosure.

What is claimed is:

1. A pitless adapter for use with a groundwater heat exchanger comprising:
   a casing comprising a first port, a second port and a third port; and
   a spool removably received within an interior cavity of the casing, the spool including:
   a top plate;
   a bottom plate;
   a first middle plate between the top and bottom plates;
   a second middle plate between the first middle plate and the bottom plate;
   a first port, a second port, and a third port in the bottom plate,
   wherein:
   the casing, the top plate and the first middle plate define a first chamber that is open to the first port of the casing and the first port of the spool;
   the casing, the first middle plate and the second middle plate define a second chamber that is open to the second port of the casing and the second port of the spool;
   the casing, the second middle plate and the bottom plate define a third chamber that is open to the third port of the casing and the third port of the spool;
   a first fluid pathway extends from the first port of the spool through the third chamber, the second middle plate, the second chamber, and the first middle plate to the first chamber;
   a second fluid pathway extends from the second port of the spool through the third chamber, and the second middle plate to the second chamber; and
   a third fluid pathway extends from the third port of the spool to the third chamber.

2. The pitless adapter of claim 1, wherein:
the spool comprises a first tube extending from the bottom plate at the first port of the spool through the third chamber, the second middle plate, and the second chamber to the first middle plate; and
the first fluid pathway extends through the first tube.

3. The pitless adapter of claim 2, wherein:
the first tube includes a perforated tubing section extending between the first middle plate and the top plate and into the first chamber; and
the first fluid pathway extends through the perforated tubing section of the first tube.

4. The pitless adapter of claim 2, wherein:
the spool comprises a second tube extending from the bottom plate at the second port of the spool through the third chamber to the second middle plate; and
the second fluid pathway extends through the second tube.

5. The pitless adapter of claim 4, wherein:
the second tube includes a perforated tubing section extending between the second middle plate and the first middle plate and into the second chamber; and
the second fluid pathway extends through the perforated tubing section of the second tube.

6. The pitless adapter of claim 4, wherein:
the spool comprises a third tube having a perforated tubing section extending from the bottom plate at the third port of the spool through the third chamber to the second middle plate; and
the third fluid pathway extends through the third tube.

7. The pitless adapter of claim 4, wherein the spool includes at least one pass-through tube extending from an opening in the top plate through an opening in the first middle plate and an opening in the second middle plate to an opening in the bottom plate.

8. The pitless adapter of claim 1, wherein:
the top plate, the first middle plate, the second middle plate and the bottom plate each include an annular groove; and the pitless adapter includes an O-ring in each annular groove that forms a seal between the corresponding plate and an interior wall of the casing.

9. The pitless adapter of claim 8, wherein:
the casing comprises a cylindrical wall; and
the first port, the second port and the third port of the casing each comprise an opening in the cylindrical wall.

10. A system comprising:
a pitless adapter comprising:
  a casing comprising a first port and a second port; and
  a spool removably received within an interior cavity of the casing, the spool including:
    a top plate;
    a bottom plate;
    a middle plate between the top and bottom plates; and
    a first port and a second port in the bottom plate, wherein:
      the casing, the top plate and the middle plate define a first chamber that is open to the first port of the casing and the first port of the spool;
      the casing, the middle plate and the bottom plate define a second chamber that is open to the second port of the casing and the second port of the spool;
      a first fluid pathway extends from the first port of the spool through the second chamber and the middle plate to the first chamber; and
      a second fluid pathway extends from the second port of the spool to the second chamber;
a groundwater heat exchanger having a first port and a second port, and configured to exchange heat between a fluid flow received from the first or second port of the spool with groundwater in which the groundwater heat exchanger is submerged;
a first pipe connecting the first port of the groundwater heat exchanger to the first port of the spool; and
a second pipe connecting the second port of the groundwater heat exchanger to the second port of the spool.

11. The system of claim 10, wherein:
the spool comprises a first tube extending from the bottom plate at the first port of the spool to the middle plate; and
the first fluid pathway extends through the first tube.

12. The system of claim 11, wherein:
the spool includes a second tube including a perforated tubing section extending from the bottom plate at the second port of the spool through the second chamber to the middle plate; and
the second fluid pathway extends through the perforated tubing section of the second tube.

13. A system comprising:
a pitless adapter comprising:
  a casing comprising a first port, a second port and a third port; and
  a spool removably received within an interior cavity of the casing, the spool including:
    a top plate;
    a bottom plate;
    a first middle plate between the top and bottom plates;
    a second middle plate between the first middle plate and the bottom plate;
    a first port, a second port, and a third port in the bottom plate,
  wherein:
    the casing, the top plate and the first middle plate define a first chamber that is open to the first port of the casing and the first port of the spool;
    the casing, the first middle plate and the second middle plate define a second chamber that is open to the second port of the casing and the second port of the spool;
    the casing, the second middle plate and the bottom plate define a third chamber that is open to the third port of the casing and the third port of the spool;
    a first fluid pathway extends from the first port of the spool through the third chamber, the second middle plate, the second chamber, and the first middle plate to the first chamber;
    a second fluid pathway extends from the second port of the spool through the third chamber, and the second middle plate to the second chamber; and
    a third fluid pathway extends from the third port of the spool to the third chamber,
a groundwater heat exchanger having a first exchanger port and a second exchanger port, each of which is connected to one of the first port, the second port and the third port of the spool,
wherein the groundwater heat exchanger is configured to exchange heat between a fluid flow received from the pitless adapter at the first exchanger port with groundwater in which the groundwater heat exchanger is submerged, and discharge the fluid flow back to the pitless adapter through the second exchanger port.

14. The system of claim 13, wherein:
the spool comprises a first tube extending from the bottom plate at the first port of the spool through the third chamber, the second middle plate, and the second chamber to the first middle plate; and
the first fluid pathway extends through the first tube.

15. The system of claim 14, wherein:
the first tube includes a perforated tubing section extending between the first middle plate and the top plate and into the first chamber; and
the first fluid pathway extends through the perforated tubing section of the first tube.

16. The system of claim 14, wherein:
the spool comprises a second tube extending from the bottom plate at the second port of the spool through the third chamber to the second middle plate; and
the second fluid pathway extends through the second tube.

17. The system of claim 16, wherein:
the second tube includes a perforated tubing section extending between the second middle plate and the first middle plate and into the second chamber; and
the second fluid pathway extends through the perforated tubing section of the second tube.

18. The system of claim 16, wherein:
the spool comprises a third tube having a perforated tubing section extending from the bottom plate at the third port of the spool through the third chamber to the second middle plate; and
the third fluid pathway extends through the third tube.

19. The system of claim 13, wherein the spool includes at least one pass-through tube extending from an opening in the top plate through an opening in the first middle plate and an opening in the second middle plate to an opening in the bottom plate.

20. The system of claim 13, wherein:

the top plate, the first middle plate, the second middle plate and the bottom plate each include an annular groove; and the pitless adapter includes an O-ring in each of the annular grooves that forms a seal between the corresponding plate and an interior wall of the casing.

\* \* \* \* \*